US012427782B2

(12) United States Patent
Kuramochi

(10) Patent No.: US 12,427,782 B2
(45) Date of Patent: Sep. 30, 2025

(54) HEAD UNIT AND LIQUID DISCHARGE APPARATUS

(71) Applicant: Yuzuru Kuramochi, Kanagawa (JP)

(72) Inventor: Yuzuru Kuramochi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 190 days.

(21) Appl. No.: 18/201,193

(22) Filed: May 24, 2023

(65) Prior Publication Data

US 2023/0382124 A1 Nov. 30, 2023

(30) Foreign Application Priority Data

May 25, 2022 (JP) ................................ 2022-085259

(51) Int. Cl.
*B41J 2/175* (2006.01)
*B41J 2/045* (2006.01)
*B41J 2/14* (2006.01)

(52) U.S. Cl.
CPC ....... *B41J 2/17596* (2013.01); *B41J 2/04581* (2013.01); *B41J 2/14274* (2013.01); *B41J 2202/11* (2013.01)

(58) Field of Classification Search
CPC ......................... B41J 2/17596; B41J 2/04581; B41J 2/14274; B41J 2202/11; B41J 2202/05; B41J 2/14201
See application file for complete search history.

(56) References Cited

U.S. PATENT DOCUMENTS 5,757,396 A 5/1998 Bruner
2020/0039217 A1 2/2020 Kaiba et al.

FOREIGN PATENT DOCUMENTS

EP 3603981 A1 * 2/2020 ............ B05B 1/086
JP 55-128463 10/1980
JP 2004-142382 5/2004
(Continued)

OTHER PUBLICATIONS

Kaiba Tadashi et al., "Liquid Discharge Head, Head Unit, Apparatus for Discharging Liquid, and Liquid Discharging Method" (EP 3603981 A1), Feb. 5, 2020, [Paragraphs 0008, 0022-0027, 0049-0053]. (Year: 2020).*
(Continued)

*Primary Examiner* — Lisa Solomon
(74) *Attorney, Agent, or Firm* — XSENSUS LLP

(57) ABSTRACT

A head unit includes a liquid discharge head and circuitry. The liquid discharge head includes a nozzle plate having a nozzle, a liquid chamber to store a liquid to be discharged from the nozzle, a valve body in the liquid chamber, a valve body coupler coupled to the valve body, and a driver to drive the valve body coupler to move the valve body. The valve body is movable between a contact position at which the valve body contacts the nozzle plate to close the nozzle and a separated position at which the valve body is separated from the nozzle plate to open the nozzle. The circuitry moves the valve body between the contact position and the separated position to open and close the nozzle in a first operation, and applies vibration to the valve body while the valve body is temporarily held at the separated position in a second operation.

8 Claims, 11 Drawing Sheets

(56) References Cited

FOREIGN PATENT DOCUMENTS

| | | | | |
|---|---|---|---|---|
| JP | 2020-023177 | | 2/2020 | |
| WO | WO-2020200552 A1 | * | 10/2020 | ........... B22D 23/003 |

OTHER PUBLICATIONS

Maier Eberhard et al., "Method and Device for the Rapid Manufacture of a Three-Dimensional Workpiece From a Molten Material" (WO 2020200552 A1), Oct. 8, 2020, [Description, Whole Document]. (Year: 2020).*

Extended European Search Report issued Oct. 10, 2023 in European Patent Application No. 23174737.9, 7 pages.

* cited by examiner

HEAD UNIT AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-085259, filed on May 25, 2022, in the Japan Patent Office, the entire disclosure of which is hereby incorporated by reference herein.

BACKGROUND

Technical Field

Embodiments of the present disclosure relate to a head unit and a liquid discharge apparatus.

Related Art

In the related art, a liquid discharge head presses a movable valve body toward a discharge port from which ink is discharged to control ink discharge.

SUMMARY

Embodiments of the present disclosure describe an improved head unit that includes a liquid discharge head and circuitry. The liquid discharge head includes a nozzle plate having a nozzle, a liquid chamber to store a liquid to be discharged from the nozzle, a valve body in the liquid chamber, a valve body coupler coupled to the valve body, and a driver to drive the valve body coupler to move the valve body. The valve body is movable between a contact position at which the valve body contacts the nozzle plate to close the nozzle and a separated position at which the valve body is separated from the nozzle plate to open the nozzle. The circuitry moves the valve body between the contact position and the separated position to open and close the nozzle in a first operation, and applies vibration to the valve body while the valve body is temporarily held at the separated position in a second operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
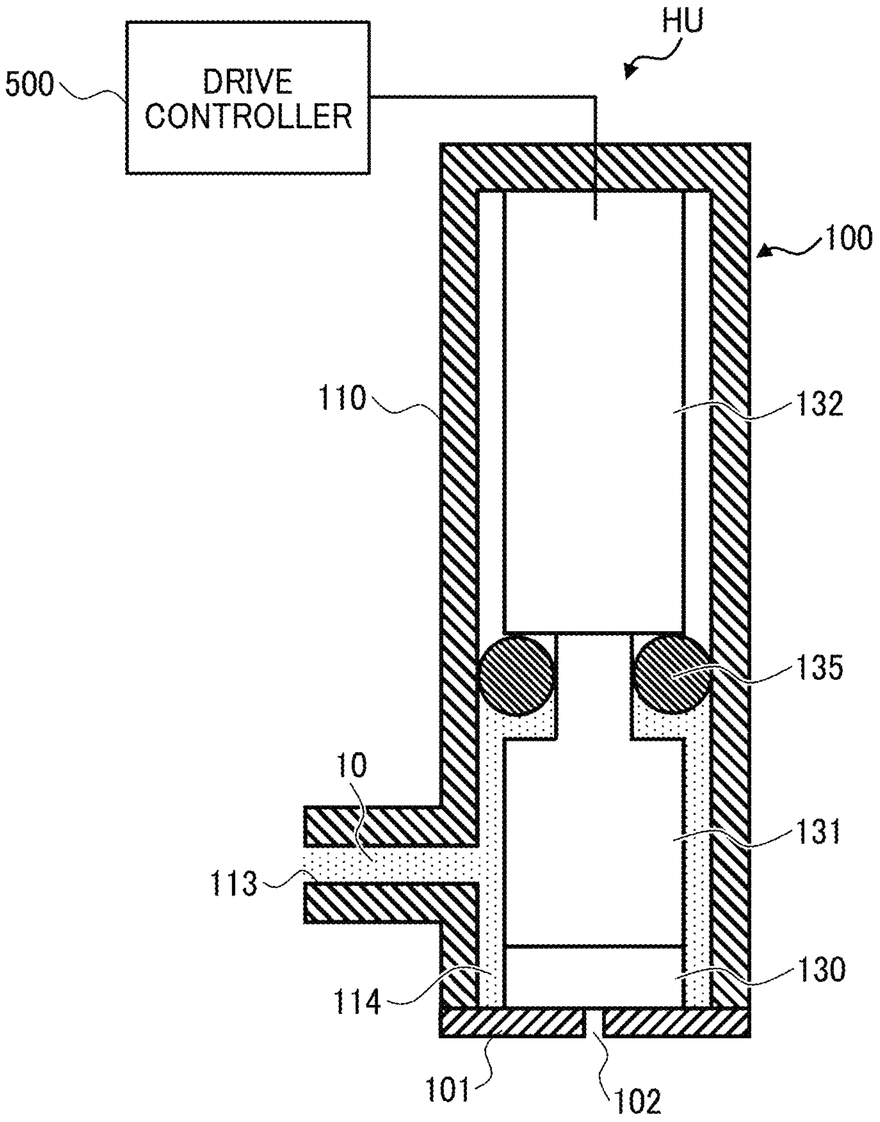
FIG. 1 is a diagram illustrating a configuration of an inkjet head unit as an example of a head unit according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to drawings. In the description of the drawings, the same elements are denoted by the same reference codes and redundant descriptions thereof are omitted below.

Configuration of Head Unit

First, a configuration of an inkjet head unit HU (hereinafter referred to as a head unit HU) as an example of a head unit according to the present embodiment is described with reference to FIG. 1. FIG. 1 is a cross-sectional view illustrating a configuration of the head unit HU as an example of a head unit according to the present embodiment. As illustrated in FIG. 1, the head unit HU includes an inkjet head 100 (hereinafter referred to as a head 100) as an example of a liquid discharge head, and a drive controller 500 as an example of circuitry.

The head 100 includes a housing 110 with a hollow structure and a nozzle plate 101 disposed at one end of the housing 110. The nozzle plate 101 has a nozzle 102 from which ink 10 as an example of a liquid is discharged. The housing 110 further has an inlet 113 from which the ink 10 is injected on a side face of the housing 110 in the vicinity of the nozzle 102. The ink 10 injected from the inlet 113 is stored in a liquid chamber 114 in the housing 110. The liquid chamber 114 is a space formed between the nozzle plate 101 and a seal 135 in the housing 110. In the liquid chamber 114, a valve body 130 is disposed adjacent to the nozzle plate 101 so as to face the nozzle 102. A needle 131 as an example of a valve body coupler is coupled to the valve body 130.

The seal 135 such as an O-ring fits onto the needle 131 so as to seal a gap between an inner face of the housing 110 and an outer circumferential surface of the needle 131. Thus, the seal 135 prevents the ink 10 in the liquid chamber 114 from flowing toward a piezoelectric element 132 as an example of a driver.

The piezoelectric element 132 is disposed in a space adjacent to the liquid chamber 114 (above the liquid chamber 114 in FIG. 1) via the seal 135. The piezoelectric element 132 drives the needle 131 according to a signal (drive waveform) from the drive controller 500 to move the valve body 130 between a contact position at which the valve body 130 contacts the nozzle plate 101 and a separated position at which the valve body 130 is separated from the nozzle plate 101. The valve body 130 is moved to open and close the nozzle 102. The piezoelectric element 132 is made of zirconia ceramics, for example. The piezoelectric element 132 has a suitable shape to discharge the ink 10 in accordance with a volume of droplets of the ink 10. The drive controller 500 is electrically connected to the piezoelectric element 132 to drive the piezoelectric element 132.

Configurations of Pressure Mechanism and Moving Mechanism

Figure 2:
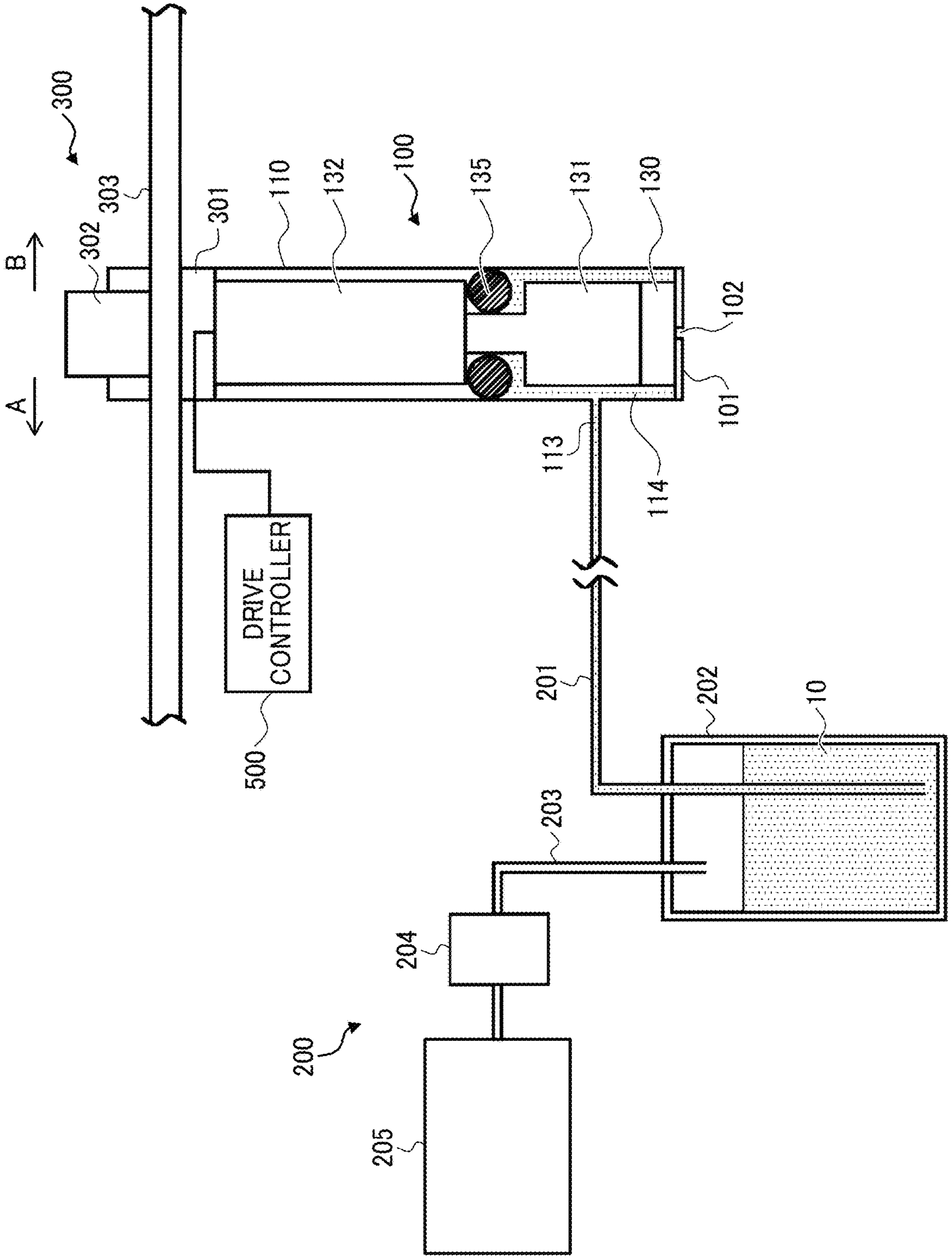
FIG. 2 is a diagram of a pressure mechanism and a moving mechanism according to an embodiment of the present disclosure.
Figure 3:
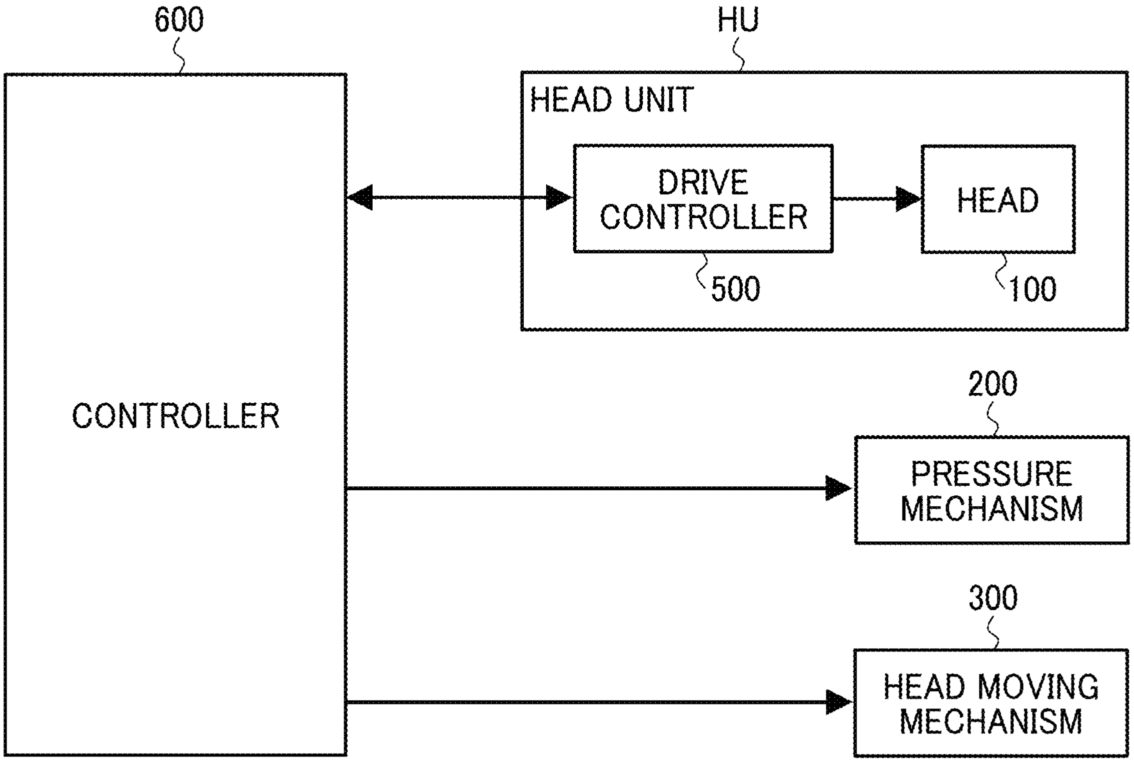
FIG. 3 is a block diagram of a control system of the head unit, the pressure mechanism, and the moving mechanism.

A pressure mechanism that pressurizes and supplies the ink 10 to the head 100 and a moving mechanism that moves the head 100 are described below with reference to FIGS. 2 and 3. FIG. 2 is a diagram of a pressure mechanism 200 and a head moving mechanism 300. FIG. 3 is a block diagram of a control system of the head unit HU, the pressure mechanism 200, and the head moving mechanism 300.

As illustrated in FIG. 2, the ink 10 to be discharged from the head 100 is stored in a sealed ink tank (liquid tank) 202. The ink tank 202 is connected to the inlet 113 of the head 100 via a tube 201. Further, the ink tank 202 is connected to a compressor 205 via a pipe 203 including an air regulator 204. The air regulator 204 adjusts a pressure of air compressed by the compressor 205 to a desired air pressure to supply the pressurized air from the compressor 205 to the ink tank 202.

Accordingly, the ink 10 pressurized by the air is supplied to the inlet 113 of the head 100. Thus, the ink 10 is discharged from the nozzle 102 when the valve body 130 opens the nozzle 102. For example, the ink tank 202, the pipe 203, the air regulator 204, and the compressor 205 function as a pressure mechanism 200 as an example of "a pressure mechanism" that pressurizes and supplies the ink 10 to the liquid chamber 114 (in other words, pressurizes the ink 10 in the liquid chamber 114).

As illustrated in FIG. 2, a portion (an upper portion in FIG. 2) of the housing 110 of the head 100 is attached to a head holder 301. The head holder 301 includes a driving device 302. The driving device 302 is driven to move the head holder 301 along a rail 303 in directions indicated by arrow A and arrow B in FIG. 2.

As a result, the head 100 attached to the head holder 301 also moves along the rail 303 in the directions indicated by arrow A and arrow B. The head holder 301, the driving device 302, and the rail 303 function as a head moving mechanism 300 as an example of "a moving mechanism" that moves the head 100 relative to an object onto which the ink 10 is discharged. The driving device 302 and the rail 303 may have a known mechanism such as a feed screw mechanism using a ball screw, a feed mechanism using a rack and pinion, or a feed mechanism using a power transmission belt and a pulley.

As illustrated in FIG. 3, the head unit HU, the pressure mechanism 200, and the head moving mechanism 300 are electrically connected to a controller 600. The controller 600 may have, for example, a function of controlling the overall operation of a liquid discharge apparatus, which is described later, and may be connected to additional components other than the unit and mechanisms illustrated in FIG. 3, if desired.

The controller 600 transmits an ink discharge cycle signal based on image data to the drive controller 500 of the head unit HU, for example. The controller 600 receives data indicating a state of the head 100 via the drive controller 500. The controller 600 transmits a switching signal for switching pressurization of the ink 10 on and off to the pressure mechanism 200. Further, the controller 600 transmits a movement signal for moving the head 100 to the head moving mechanism 300.

The drive controller 500 of the head unit HU generates the drive waveform based on the ink discharge cycle signal received from the controller 600, and drives the head 100 using the generated drive waveform. The head 100 opens and closes the nozzle 102 in accordance with the drive waveform from the drive controller 500 to discharge the ink 10.

The pressure mechanism 200 switches the compressor 205 (or the air regulator 204) on and off based on the switching signal received from the controller 600 to switch between a pressurized state and a non-pressurized state of the ink 10 to be supplied to the liquid chamber 114. The head moving mechanism 300 drives the driving device 302 to move the head holder 301 in a predetermined direction by a predetermined distance based on the movement signal received from the controller 600, and moves the head 100 to a desired position via the head holder 301.

Operation of Head Unit

Figure 4A:
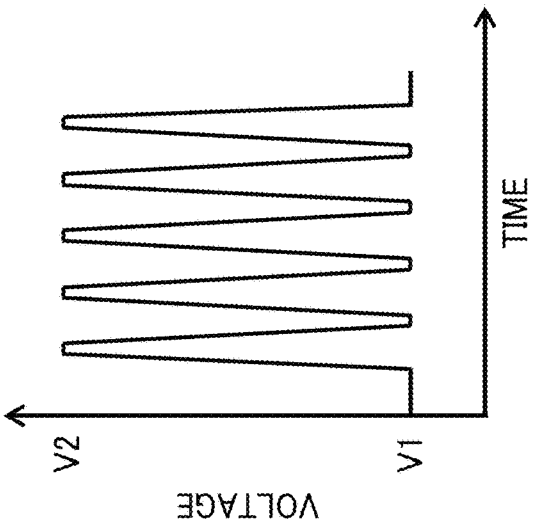
FIGS. 4A to 4C are graphs of a head drive waveform according to an embodiment of the present disclosure.
Figure 4B:
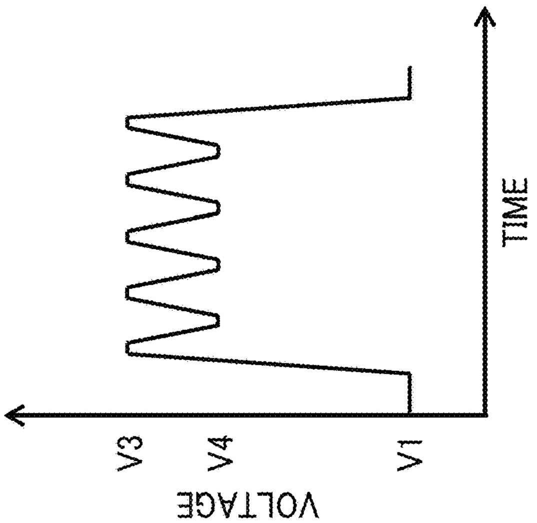
Figure 4C:
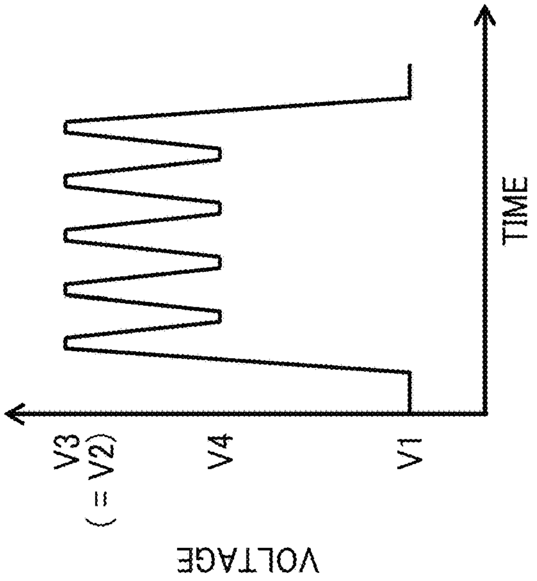
Figure 5A:
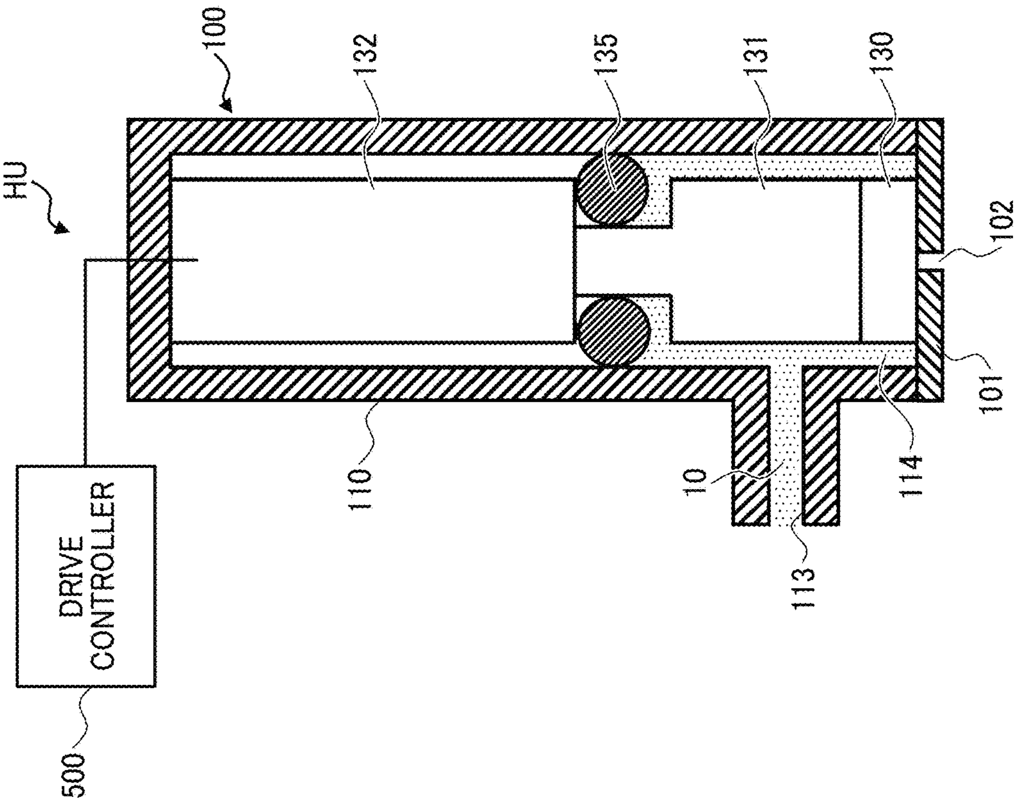
FIGS. 5A and 5B are diagrams illustrating an operation of the head unit.
Figure 5B:
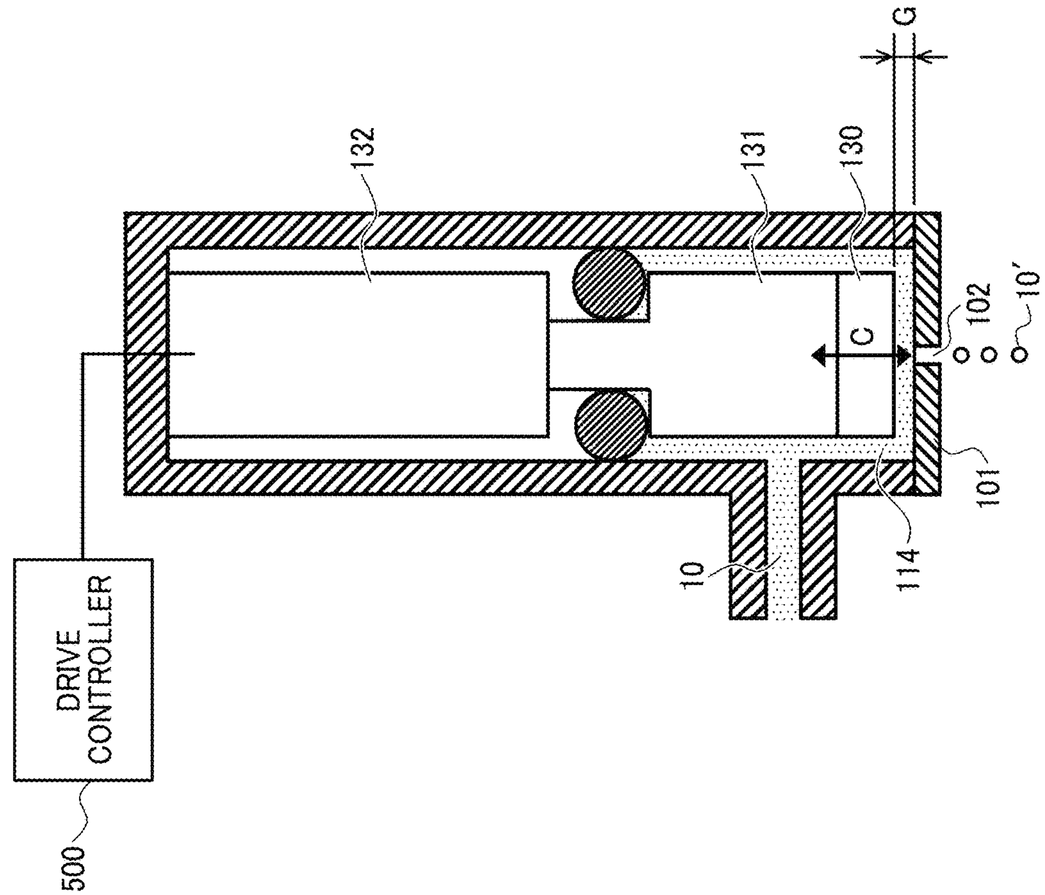
Figure 6:
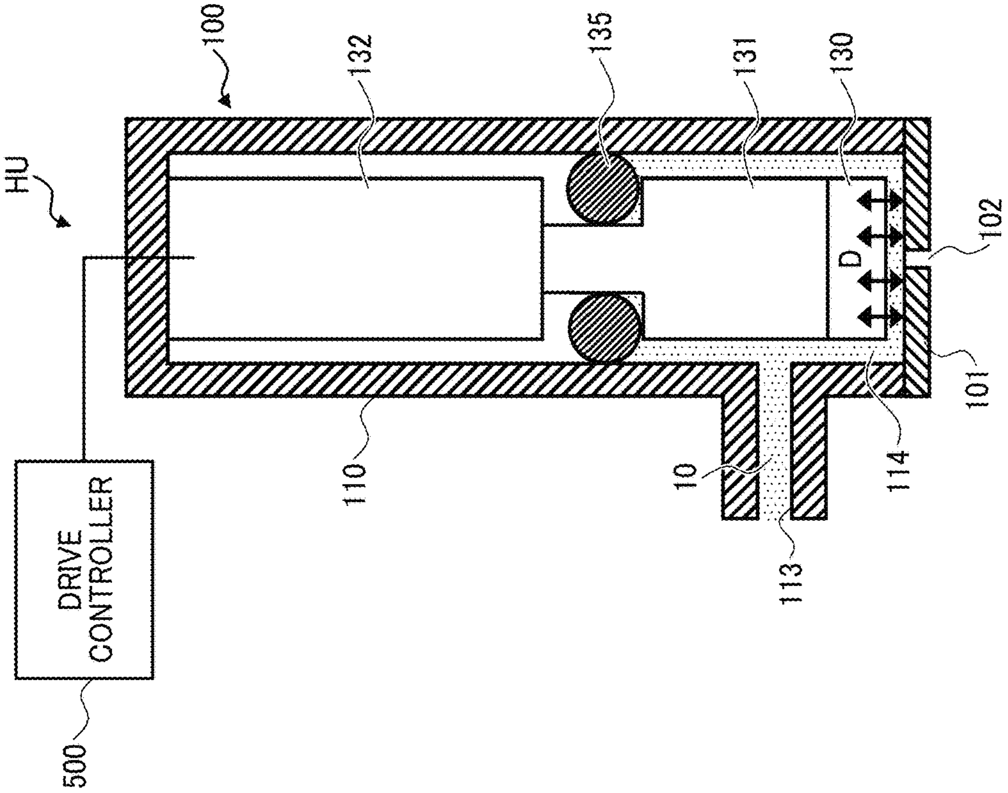
FIG. 6 is a diagram illustrating the operation of the head unit.

Operations of the head unit HU are described below with reference to FIG. 4A to FIG. 6. FIGS. 4A to 4C are graphs of the drive waveform of the head 100. FIG. 4A illustrates the drive waveform for discharging the ink 10 from the head 100 (i.e., a liquid discharge waveform), and FIGS. 4B and 4C illustrate the drive waveforms for vibrating the valve body 130 of the head 100 (i.e., a valve-body vibration waveform). FIGS. 5A and 5B, and FIG. 6 are diagrams illustrating the operation of the head unit HU.

The drive controller 500 generates the liquid discharge waveform illustrated in FIG. 4A and the valve-body vibration waveform illustrated in FIG. 4B, and applies the liquid discharge waveform and the valve-body vibration waveform to the piezoelectric element 132. A voltage V3 of the valve-body vibration waveform is larger than a voltage V1 of the liquid discharge waveform and the valve-body vibration waveform, and is smaller than a voltage V2 of the liquid discharge waveform. A voltage V4 of the valve-body vibration waveform is smaller than the voltage V3 and larger than the voltage V1.

In the liquid discharge waveform, illustrated in FIG. 4A, applied from the drive controller 500 to the piezoelectric element 132, when the voltage V1 is applied to the piezoelectric element 132, the valve body 130 is at the contact position at which the valve body 130 contacts the nozzle plate 101 as illustrated in FIG. 5A. In this state, since the valve body 130 closes the nozzle 102, the ink 10 in the liquid chamber 114 is not discharged from the nozzle 102.

When the voltage V2 is applied to the piezoelectric element 132, the piezoelectric element 132 contracts as illustrated in FIG. 5B, and moves the needle 131 upward in FIG. 5B. As the needle 131 moves, the valve body 130 also moves to the separated position at which the valve body 130 is separated from the nozzle plate 101, and a gap G is formed between a leading end of the valve body 130 and the nozzle 102. The pressure mechanism 200 pressurizes and supplies the ink 10 into the liquid chamber 114 at a pressure of about 0.1 to 3.0 MPa, for example. The ink 10 in the liquid chamber 114 is discharged as ink droplets 10' from the nozzle 102 as the gap G is formed.

Thus, when the liquid discharge waveform is applied to the piezoelectric element 132, the valve body 130 moves between the contact position and the separated position (in directions indicated by arrow C in FIG. 5B), and the valve body 130 opens and closes the nozzle 102. Thus, the drive controller 500 controls the valve body 130 to open and close the nozzle 102, thereby discharging the ink 10 from the nozzle 102 (hereinafter, this control is also referred to as a "first operation").

In the valve-body vibration waveform, illustrated in FIG. 4B, applied from the drive controller 500 to the piezoelectric elements 132, when the voltage V3 and the voltage V4 are alternately applied to the piezoelectric element 132, the valve body 130 moves in directions indicated by arrows D in FIG. 6 via the piezoelectric element 132 and the needle 131. In other words, the valve body 130 moves, at the separated position separated from the nozzle plate 101, with an amplitude smaller than an amplitude when the ink 10 is discharged from the nozzle 102. Since the voltage V3 and the voltage V4 in the valve-body vibration waveform are larger than the voltage V1 in the liquid discharge waveform illustrated in FIG. 4A, the valve body 130 is separated from the nozzle plate 101 when the voltage V3 or the voltage V4 is applied to the piezoelectric element 132. This movement of the valve body 130 with the small amplitude causes foreign substances adhering to the surface of the valve body 130 to fall off.

Since the voltages V3 and V4 are smaller than the voltage V2 in the liquid discharge waveform as illustrated in FIGS. 4A and 4B, the valve body 130 can be vibrated by a potential difference of the valve-body vibration waveform smaller than that of the liquid discharge waveform, so that heat generation and power consumption of the piezoelectric element 132 can be reduced.

That is, the drive controller 500 controls the valve body 130 to vibrate at the separated position separated from the nozzle plate 101, causing the foreign substances adhering to the surface of the valve body 130 to fall off (hereinafter, this control is also referred to as a "second operation").

In the valve-body vibration waveform illustrated in FIG. 4B, the voltages V3 and V4 are set smaller than the voltage V2, but the voltages V3 and V4 can be set to arbitrary voltages at which the valve body 130 is positioned away from the nozzle plate 101. For example, as illustrated in FIG. 4C, the voltage V3 of the valve-body vibration waveform may be the same as the voltage V2 of the liquid discharge waveform. The voltage V3 equal to the voltage V2 can simplifies a voltage control by the drive controller 5X).

As another example, the voltage V3 of the valve-body vibration waveform may be set larger than the voltage V2 of the liquid discharge waveform to vibrate the valve body 130 with a large amplitude at a position where the valve body 130 is sufficiently separated from the nozzle plate 101. As a result, the foreign substances adhering to the valve body 130 can be removed more effectively.

In FIGS. 4B and 4C, in the valve-body vibration waveform, the voltage V3 and the voltage V4 are alternately applied to the piezoelectric element 132, but the shape of the waveform is not limited thereto. The valve-body vibration waveform may be any waveform, such as a sine wave or a triangular wave, that can vibrate the valve body 130 at the separated position separated from the nozzle plate 101.

The drive controller 500 can selectively execute the first operation and the second operation described above. For example, the drive controller 500 executes the second operation before the first operation so as to start a liquid discharge operation after the foreign substances on the surface of the valve body 130 are removed.

In the above description, the piezoelectric element 132 has, but not limited to, a property of contracting in a direction away from the nozzle plate 101 when a voltage is applied. For example, the piezoelectric element 132 may have a property of expanding toward the nozzle plate 101 when a voltage is applied. In such a case, when the voltage V2 is applied to the piezoelectric element 132, the piezoelectric element 132 expands, causing the valve body 130 to close the nozzle 102, and when the voltage V1 is applied to the piezoelectric element 132, the piezoelectric element 132 contracts, causing the valve body 130 to open the nozzle 102 to discharge the ink 10 pressurized and supplied into the liquid chamber 114 from the nozzle 102.

As described above, the head unit HU according to the present embodiment includes the head 100 and the drive controller 500. The head 100 includes the nozzle plate 101 having the nozzle 102, the liquid chamber 114 to store the ink 10 to be discharged from the nozzle 102, the valve body 130 in the liquid chamber 114, the needle 131 coupled to the valve body 130, and the piezoelectric element 132 to drive the needle 131 to move the valve body 130. The drive controller 500 executes the first operation of the piezoelectric element 132 to move the valve body 130 between the contact position at which the valve body 130 contacts the nozzle plate 101 and the separated position at which the valve body 130 is separated from the nozzle plate 101 to open and close the nozzle 102, and executes the second operation of the piezoelectric element 132 to vibrate the valve body 130 at the separated position.

In addition, as described above, the drive controller 500 selectively execute the first operation and the second operation. With this configuration, the foreign substances (e.g., components, particles, and the like in the ink 10) adhering to the surface of the valve body 130 can be removed from the valve body 130, thereby preventing deterioration of sealing performance of the nozzle 102 due the foreign substances adhering to the valve body 130.

Modification

Figure 7:
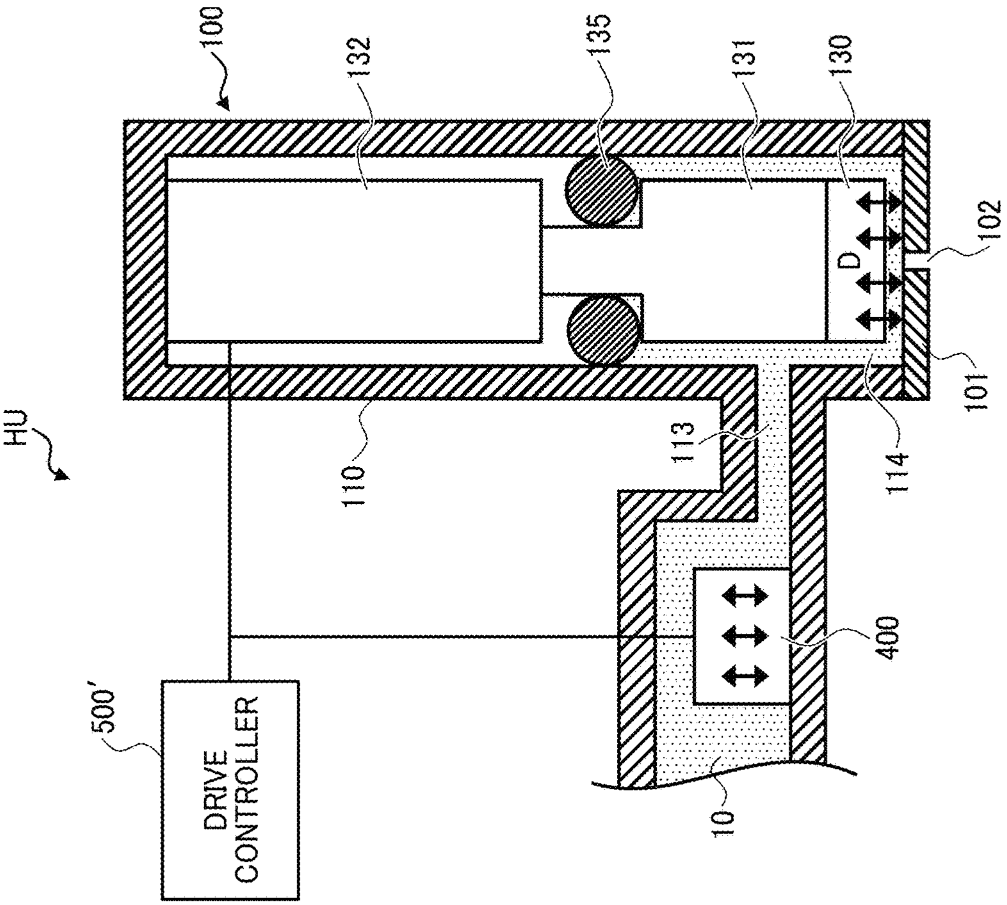
FIG. 7 is a diagram illustrating a configuration of the head unit according to a modification of the present disclosure.

FIG. 7 is a diagram illustrating a configuration of the head unit HU according to a modification of the present disclosure. In this modification, the head unit HU further includes a liquid path (i.e., the tube 201) communicating with the liquid chamber 114 and a vibrator 400 in the liquid path in addition to the configuration of the above-described embodiment.

A drive controller 500' causes the vibrator 400 to apply vibrations to the ink 10 in the liquid path. As a result, the external vibrations are additionally transmitted to the valve body 130 moved (vibrated) in the directions indicated arrows D through the ink 10 to which the vibrations are applied. As a result, the foreign substances adhering to the valve body 130 can be removed more effectively.

Operation in Liquid Discharge Apparatus

Figure 8A:
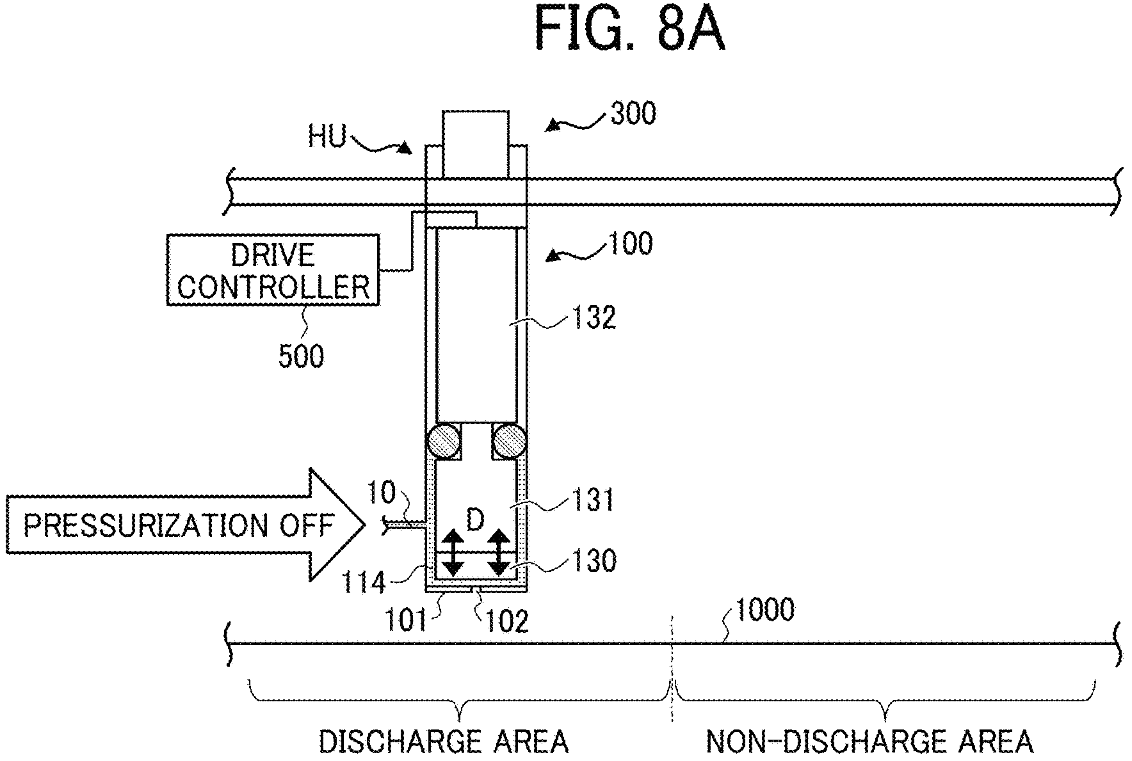
FIGS. 8A and 8B are diagrams illustrating the operation of the head unit in a liquid discharging apparatus.
Figure 8B:
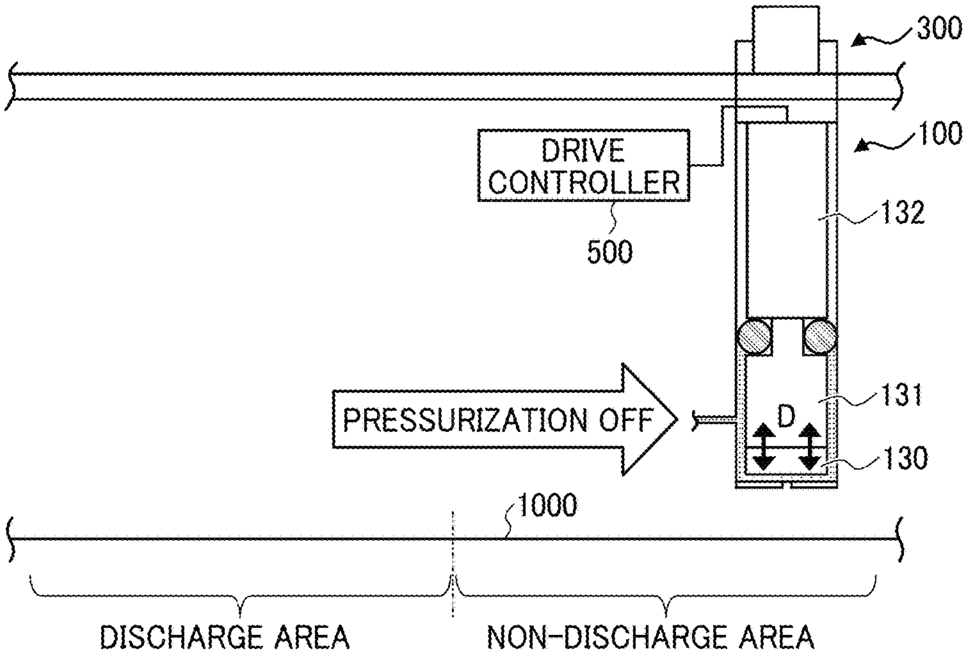

FIGS. 8A and 8B are diagrams illustrating an operation of the head unit HU in a liquid discharging apparatus. As described with reference to FIG. 2, in the liquid discharge apparatus, the head moving mechanism 300 moves the head unit HU in the left-right direction in FIGS. 8A and 8B.

When the drive controller 500 executes the second operation of vibrating the valve body 130 in the directions indicated by arrows D using the valve-body vibration waveform, as illustrated in FIG. 8A, the controller 600 causes the pressure mechanism 200 not to pressurize the ink 10 (i.e., the non-pressurized state). On the other hand, in the first operation of moving the valve body 130 between the contact position at which the valve body 130 contacts the nozzle plate 101 and the separated position at which the valve body 130 is separated from the nozzle plate 101 to discharge the ink 10 from the nozzle 102, the controller 600 causes the pressure mechanism 200 to pressurize the ink 10 (i.e., the pressurized state). In the second operation, the controller 600 causes the pressure mechanism 200 to stop pressurizing the ink 10.

With this configuration, when the ink 10 is discharged toward a discharge area of an object 1000 onto which the ink 10 is discharged, the pressure is applied to the ink 10 so as to reliably discharge the ink 10 from the nozzle 102. When the valve body 130 is vibrated to remove the foreign substances adhering to the valve body 130, this configuration prevents the ink 10 from being unintentionally discharged toward the object 1000. In addition, consumption of the ink 10 can be reduced.

In this case, since the nozzle 102 is opened as illustrated in FIG. 8A, even if the ink is not pressurized, the ink 10 may be unintentionally discharged due to pressure fluctuation in the head unit HU, electrical noise in the drive controller 500, or the like.

For this reason, the controller 600 causes the pressure mechanism 200 to stop pressurizing the ink 10, and further causes the head moving mechanism 300 to move the head unit HU to an evacuation position at which the nozzle 102 does not face the discharge area of the object 1000 (i.e., the nozzle 102 faces a non-discharge area of the object 1000 or does not face the object 1000). Then, the valve body 130 is moved away from the nozzle plate 101 and vibrated at the evacuation position where the head 100 faces the non-discharge area or does not face the object 1000. As a result, the ink 10 is not discharged onto the discharge area unintentionally.

Figure 9A:
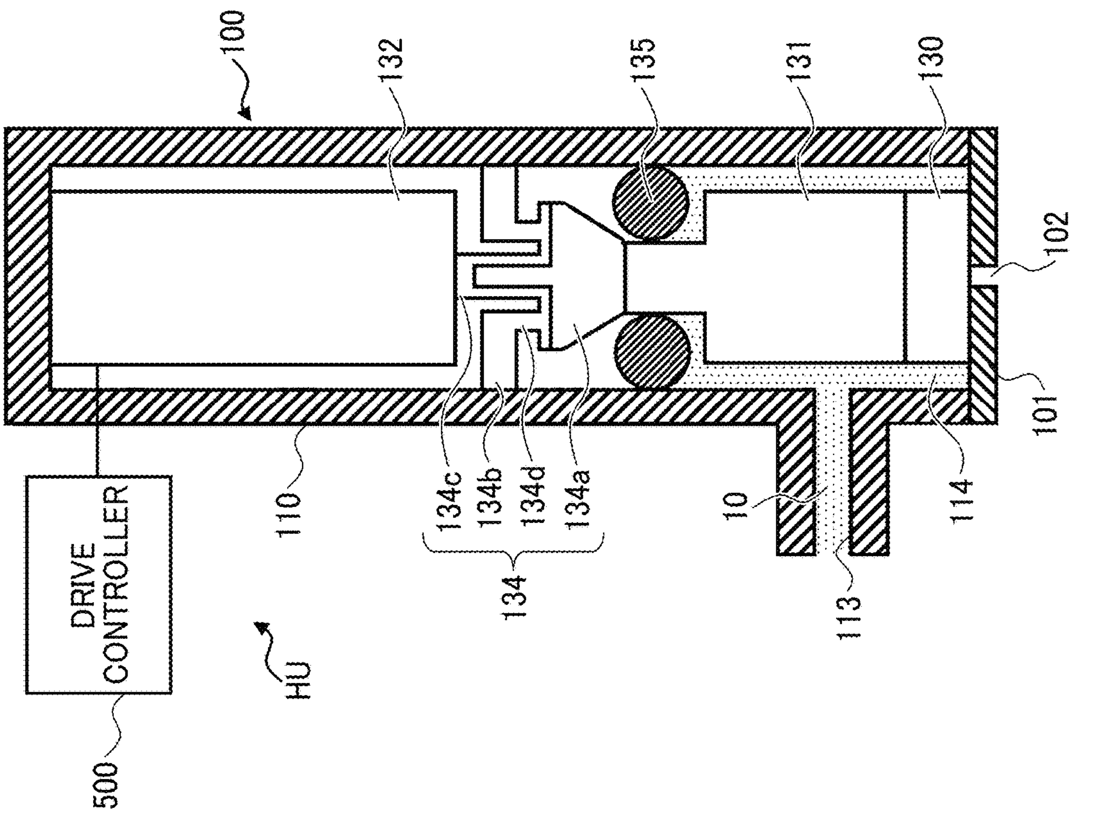
FIGS. 9A and 9B are diagrams of the head unit according to another embodiment of the present disclosure.
Figure 9B:
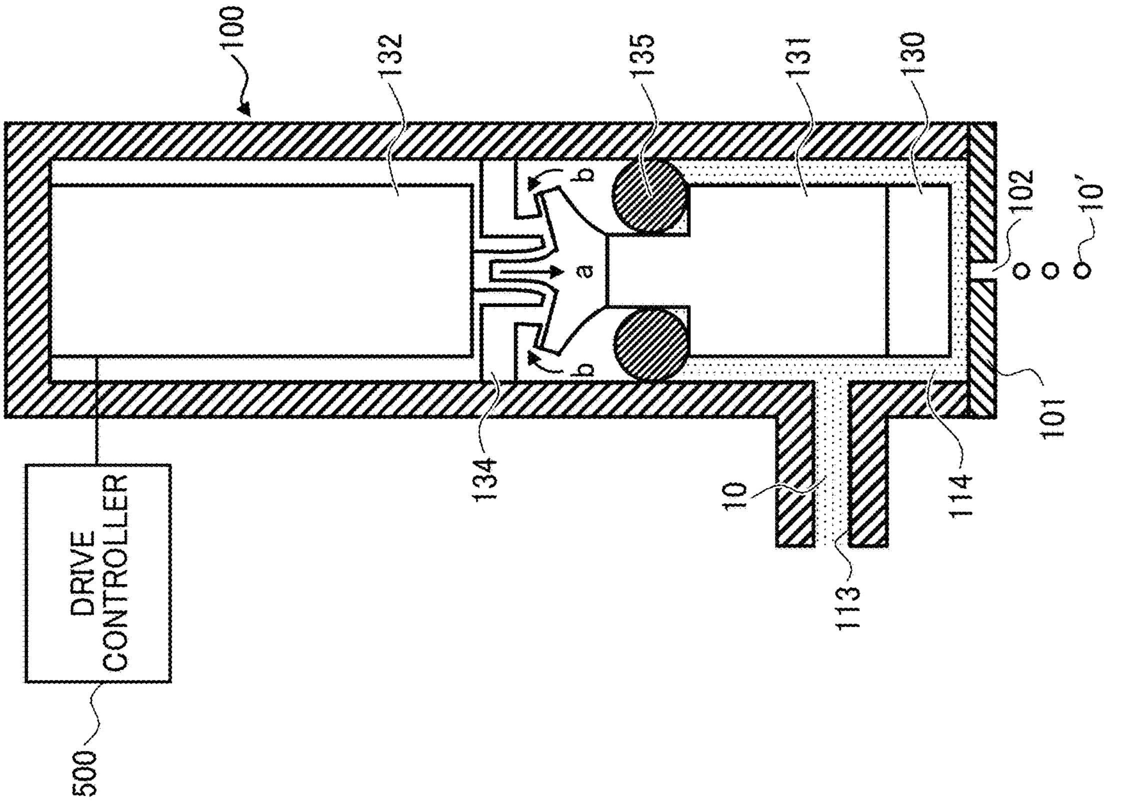

Next, another embodiment of the present disclosure is described with reference to FIGS. 9A and 9B. FIGS. 9A and 9B are diagrams of the head unit HU according to another embodiment of the present disclosure. FIG. 9A is a cross-sectional view of the head unit HU with the nozzle 102 closed, and FIG. 9B is a cross-sectional view of the head unit HU with the nozzle 102 opened.

This embodiment is different from the above-described embodiment in that a reverse spring mechanism 134 as an example of a transmission mechanism is disposed between the needle 131 and the piezoelectric element 132. In this embodiment, the piezoelectric element 132 has the property of expanding toward the nozzle plate 101 when a voltage is applied.

The reverse spring mechanism 134 is an elastic body formed of rubber, soft resin, or thin metal plate which is appropriately processed to be deformable. The reverse spring mechanism 134 includes a deformable portion 134*a*, a secured portion 134*b*, a guide portion 134*c*, and a bent side 134*d*.

The deformable portion 134*a* has a substantially trapezoidal cross-section. The deformable portion 134*a* contacts a base end (upper end in FIG. 9A) of the needle 131. The secured portion 134*b* is secured to the deformable portion 134*a* and the inner wall of the housing 110. The guide portion 134*c* couples the secured portion 134*b* and the piezoelectric element 132. The bent side 134*d* couples the long side (corresponding to the lower base of the trapezoid) of the trapezoidal deformable portion 134*a* and the secured portion 134*b*.

With the reverse spring mechanism 134 having the above-described configuration, the piezoelectric element 132 expands when a predetermined voltage is applied to the piezoelectric element 132. The guide portion 134*c* is pushed toward the nozzle 102 by the expanded piezoelectric element 132 in the direction indicated by arrow a in FIG. 9B.

This pushing force causes the deformable portion 134*a* to be retracted in the direction away from the nozzle 102 (direction indicated by arrows b in FIG. 9B). That is, the reverse spring mechanism 134 converts an expanding force of the piezoelectric element 132 into a retracting force to retract the needle 131, and then transmits the retracting force to the needle 131. In this embodiment, when a voltage is applied to the piezoelectric element 132, the piezoelectric element 132 expands, and accordingly the valve body 130 opens the nozzle 102. As a result, the head 100 discharges the ink droplets 10' from the nozzle 102.

As described above, in this embodiment, the reverse spring mechanism 134 is disposed between the needle 131 and the piezoelectric element 132. The reverse spring mechanism 134 converts the expanding force of the piezoelectric element 132 into the retracting force to retract the needle 131, which acts in the direction opposite to the expanding force, and then transmits the retracting force to the needle 131. Also in this embodiment, the foreign substances adhering to the surface of the valve body 130 can be removed from the valve body 130 by the second operation described above, thereby preventing the deterioration of sealing performance of the nozzle 102 due the foreign substances adhering to the valve body 130.

Application Example

Figure 10:
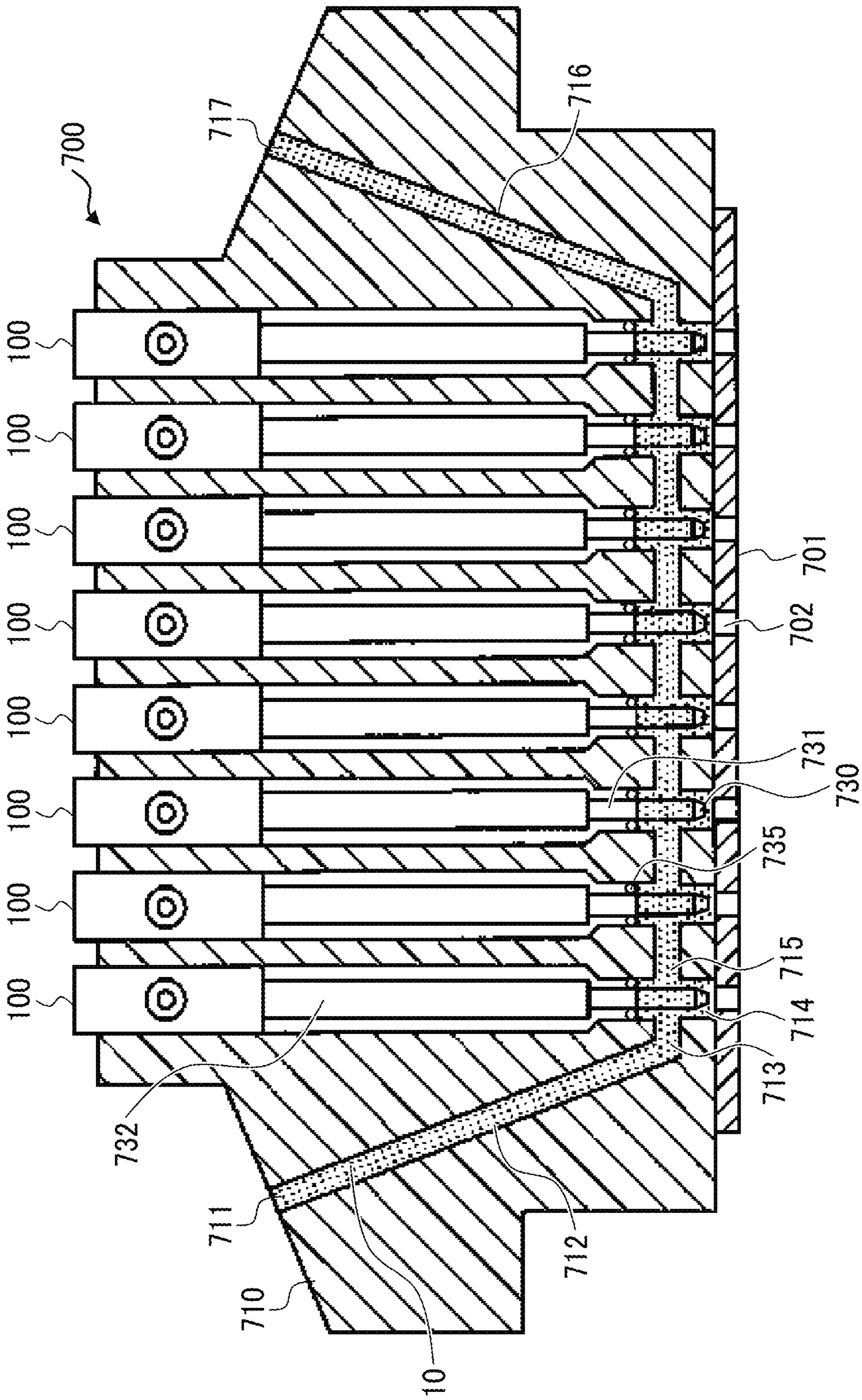
FIG. 10 is a diagram illustrating an example of a head module to which the head unit is applied.

An application example in which the head 100 described above is used is describe with reference to FIG. 10. FIG. 10 is a cross-sectional view of a head module 700 according to the application example. As illustrated in FIG. 10, the head module 700 includes a plurality of heads 100 (eight heads 100 in the example illustrated in FIG. 10) in a housing 710.

The housing 710 includes a supply port 711 through which the ink 10 is supplied into the housing 710, a supply path 712 connecting the supply port 711 and an inlet 713, and a drain port 715 on the opposite side to the inlet 713 across a liquid chamber 714. The housing 710 further includes a collection port 717 from which the ink 10 in the housing 710 is collected, and a collection path 716 connecting the collection port 717 and the drain port 715.

The basic configuration of the plurality of heads 100 is the same as that described with reference to FIGS. 1 to 6, and corresponding elements in FIG. 10 are given reference numerals in the 700 series (e.g., a nozzle plate 701, a valve body 730, a needle 731, a piezoelectric element 732, a seal 735, and the like).

In this application example, eight nozzles 702 of the eight heads 100 are arranged at substantially equal intervals in one direction (the left-right direction in FIG. 10). Each of the heads 100 is disposed extending in the vertical direction so as to discharge the ink 10 downward from the nozzle 702 disposed at a lower portion of the head 100 in FIG. 10.

The liquid chamber 714 of each head 100 penetrates the head 100 so that the ink 10 flows from one side (the left side in FIG. 10) to the other side (the right side in FIG. 10) in the direction of arrangement of the eight heads 100. In other words, each head 100 has a configuration different from the above-described embodiment in that the drain port 715 is disposed on the side of the liquid chamber 714 opposite to the inlet 713.

Applied Case

Figure 11:
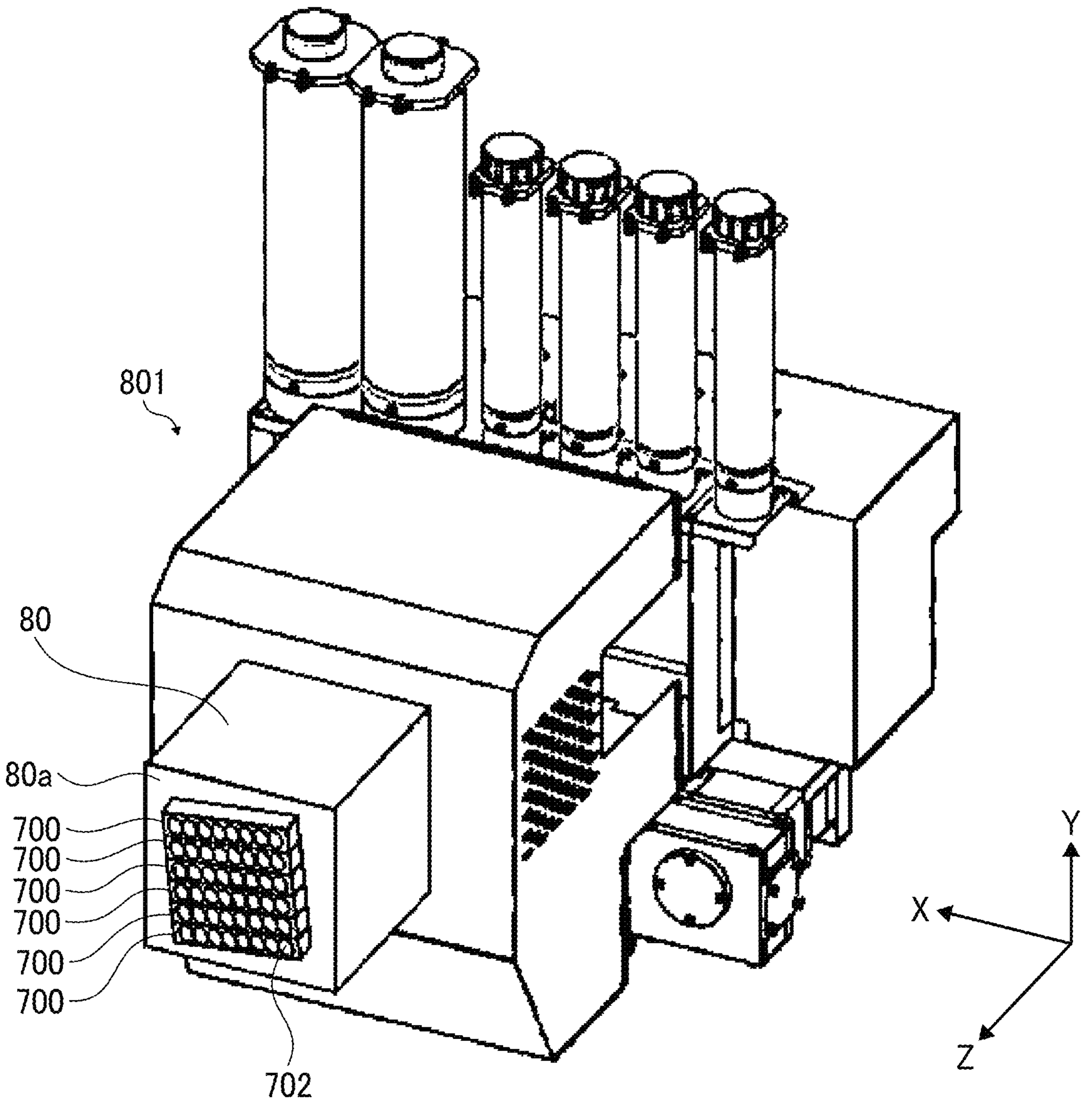
FIG. 11 is an overall perspective view of a carriage on which the head module is mounted.
Figure 12:
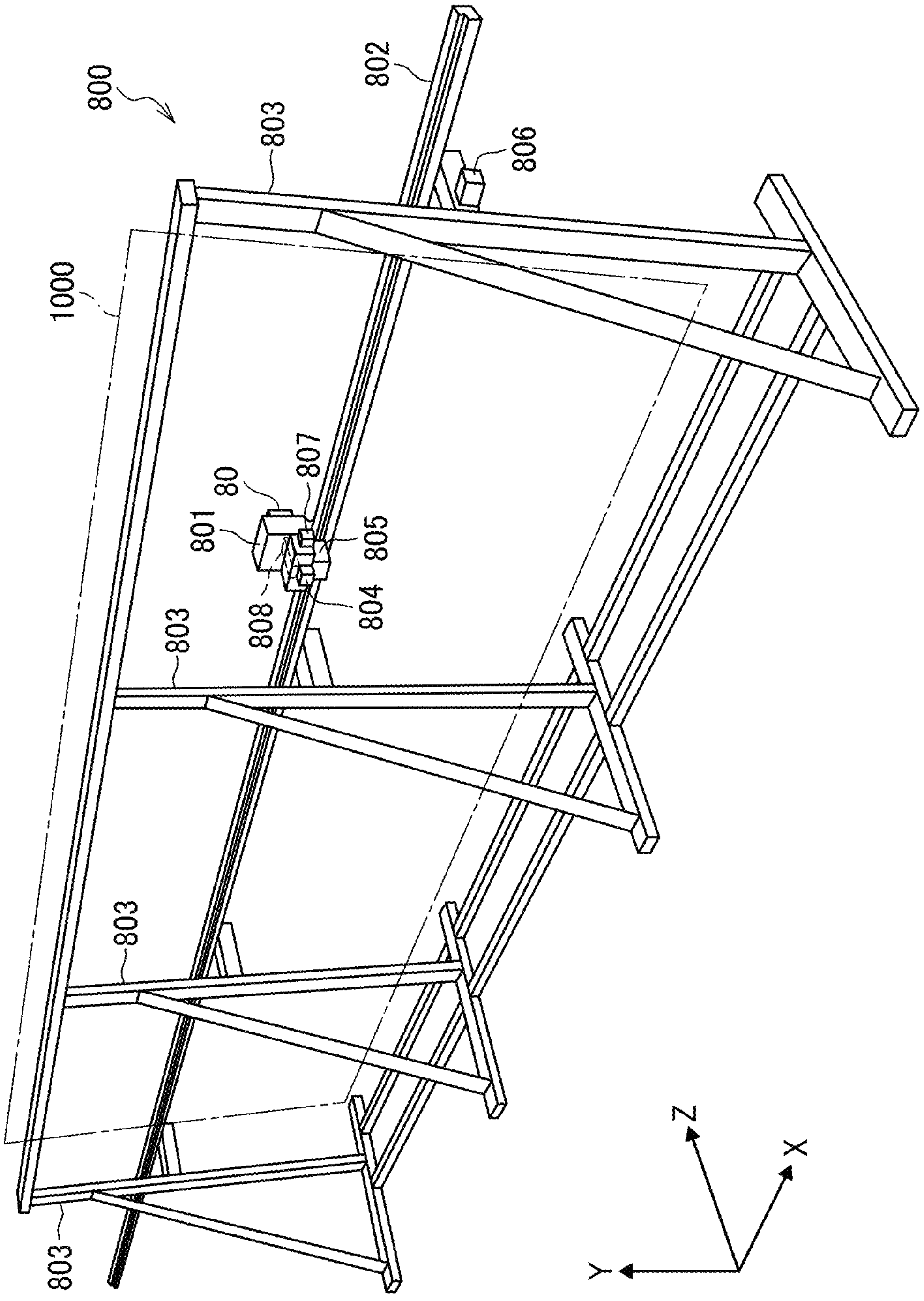
FIG. 12 is an overall perspective view of a liquid discharge apparatus including the carriage.

An applied case of the head module 700 described with reference to FIG. 10 is described below with reference to FIGS. 11 and 12. FIG. 11 is an overall perspective view of a carriage 801 on which the head module 700 is mounted, and FIG. 12 is an overall perspective view of a liquid discharge apparatus 800 including the carriage 801. FIG. 1I illustrates the carriage 801 mounted on the liquid discharge apparatus 800 illustrated in FIG. 12 as viewed from the object 1000 onto which a liquid such as the ink 10 is discharged.

The carriage 801 includes ahead holder 80. The carriage 801 is movable in the Z-direction (positive and negative directions) along a Z-axis rail 804 by driving force of a first Z-direction driver 807 which is described later. The head holder 80 is movable in the Z-direction (positive and negative directions) relative to the carriage 801 by driving force of a second Z-direction driver 808 which is described later. The head holder 80 includes ahead fixing plate 80*a* for attaching the head module 700.

In this applied case, the six head modules 700 described with reference to FIG. 10 are attached to the head fixing plate 80*a* and stacked one on another. Each of the head modules 700 includes the multiple nozzles 702. The number and type of ink used in the head modules 700 is not particularly limited, and the ink may be different color for each head module 700 or may be the same color for all head modules 700. For example, when the liquid discharge apparatus 800 is a coating apparatus using a single color, the ink 10 used in the head modules 700 may be the same color Further, the number of head modules 700 is not limited to six, and may be more than six or less than six.

The head modules 700 are secured to the head fixing plate 80*a* such that a nozzle row, which is formed by the eight nozzles 702, of each head module 700 intersects the horizontal plane (i.e., X-Z plane) and the multiple nozzles 702 are obliquely arrayed with respect to the X-axis as illustrated in FIG. 11. Thus, the head module 700 discharges the ink from the nozzles 702 in a direction (positive Z direction in the present embodiment) intersecting the direction of gravity.

The liquid discharge apparatus 800 such as a printing apparatus is installed to face the object 1000 as illustrated in FIG. 12. The liquid discharge apparatus 800 includes an X-axis rail 802, a Y-axis rail 803 intersecting the X-axis rail 802, and the Z-axis rail 804 intersecting the X-axis rail 802 and the Y-axis rail 803.

The Y-axis rail 803 movably holds the X-axis rail 802 in the Y direction (positive and negative directions). The X-axis rail 802 movably holds the Z-axis rail 804 in the X direction (positive and negative directions). The Z-axis rail 804 movably holds the carriage 801 in the Z direction (positive and negative directions).

The liquid discharge apparatus 800 includes the first Z-direction driver 807 and an X-direction driver 805. The first Z-direction driver 807 moves the carriage 801 in the Z direction along the Z-axis rail 804. The X-direction driver 805 moves the Z-axis rail 804 in the X direction along the X-axis rail 802. The liquid discharge apparatus 800 further includes a Y-direction driver 806 that moves the X-axis rail 802 in the Y direction along the Y-axis rail 803. The liquid discharge apparatus 800 includes the second Z-direction driver 808 that moves a head holder 80 relative to the carriage 801 in the Z direction.

The liquid discharge apparatus 800 discharges the ink 10 from the head modules 700 (see FIG. 11) mounted on the head holder 80 while moving the carriage 801 in the X direction, the Y direction, and the Z direction, thereby printing images on the object 1000. The movement of the carriage 801 and the head holder 80 in the Z direction is not necessarily parallel to the Z direction, and may be an oblique movement including at least a Z direction component.

Although the object 1000 is flat in FIG. 12, the object 1000 may have a surface shape which is a nearly vertical surface, a curved surface with the large radius of curvature, and a surface having a slight unevenness, such as a body of a car, a truck, or an aircraft.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

These liquids can be used for, e.g., inkjet ink, coating paint, surface treatment solution, a liquid for forming components of electronic element or light-emitting element or a resist pattern of electronic circuit, or a material solution for three-dimensional fabrication.

The liquid discharge apparatus according to the present embodiment is not limited to the printing apparatus described above. For example, the head unit (or the head) according to the above-described embodiments of the present disclosure may be attached to a tip of a robot arm of a multi-articulated robot that can freely move like a human arm by a plurality of joints.

The liquid discharge apparatus is not limited to a configuration in which the head is moved relative to an object. A configuration in which the head and the object are movable relative to each other, for example, the object is moved relative to the liquid discharge head is applicable.

The above-described embodiments are one of examples and, for example, the following Aspects 1 to 6 of the present disclosure can provide the following advantages.

Aspect 1

According to Aspect 1, a head unit (e.g., the head unit HU) includes a liquid discharge head (e.g., the head 100) and circuitry (e.g., the drive controller 500). The liquid discharge head includes a nozzle plate having a nozzle, a liquid chamber to store a liquid to be discharged from the nozzle, a valve body in the liquid chamber, a valve body coupler (e.g., the needle 131) coupled to the valve body, and a driver (e.g., the piezoelectric element 132) to drive the valve body coupler to move the valve body. The valve body is movable between a contact position at which the valve body contacts the nozzle plate to close the nozzle and a separated position at which the valve body is separated from the nozzle plate to open the nozzle. The circuitry move the valve body between the contact position and the separated position to open and close the nozzle in a first operation, and applies vibration to the valve body while the valve body is temporarily held at the separated position in a second operation.

Aspect 2

According to Aspect 2, in Aspect 1, the circuitry (e.g., the drive controller 500) selectively executes the first operation and the second operation.

According to Aspect 1 and Aspect 2, foreign substances adhering to the surface of the valve body can be removed from the valve body, thereby preventing the deterioration of the sealing performance of the nozzle due to the foreign substances adhering to the valve body.

Aspect 3

According to Aspect 3, in Aspect 1 or Aspect 2, the head unit further includes a liquid path communicating with the liquid chamber and a vibrator (e.g., the vibrator 400) in the liquid path. The vibrator applies vibrations to the liquid in the liquid path to vibrate the valve body through the liquid.

According to Aspect 3, the foreign substances adhering to the surface of the valve body can be removed more effectively.

Aspect 4

According to Aspect 4, a liquid discharge apparatus (e.g., the liquid discharge apparatus 800) includes the head unit according to any one of Aspects 1 to 3, to discharge the liquid onto an object.

Aspect 5

According to Aspect 5, in Aspect 4, the liquid discharge apparatus further includes a pressure mechanism (e.g., the pressure mechanism 200) to pressurize the liquid in the liquid chamber. The circuitry (e.g., the drive controller 500) executes the first operation while the pressure mechanism applies a pressure to the liquid in the liquid chamber to discharge the liquid from the nozzle, and executes the second operation while the pressure mechanism temporarily stops application of the pressure to the liquid in the liquid chamber.

According to Aspect 4 and Aspect 5, when the liquid is discharged toward the discharge area of the object, since the pressure is applied to the liquid, the liquid can be reliably discharged from the nozzle. When the valve body is vibrated to remove the foreign substances adhering to the valve body, the liquid is not discharged toward the object unintentionally.

Aspect 6

According to Aspect 6, in Aspect 5, the liquid discharge apparatus further includes a moving mechanism (e.g., the head moving mechanism 300) to moves the liquid discharge head (e.g., the head 100) to face a discharge area of an object. The circuitry (e.g., the drive controller 500) executes the first operation while the pressure mechanism (e.g., the pressure mechanism 200) applies a pressure to the liquid in the liquid chamber to discharge the liquid from the nozzle onto the discharge area of the object, and executes the second operation while the pressure mechanism temporarily stops application of the pressure to the liquid in the liquid chamber and while the moving mechanism moves the liquid discharge head to an evacuation position at which the nozzle is out of the discharge area.

According to Aspect 6, the liquid (e.g., the ink 10) is not discharged onto the discharge area of the object unintentionally.

As described above, according to the present disclosure, the deterioration of sealing performance of the nozzle due to the foreign substances adhering to the surface of the valve body can be prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus, comprising;

a liquid discharge head including:
- a nozzle plate having a nozzle;
- a liquid chamber to store a liquid to be discharged from the nozzle;
- a valve body in the liquid chamber, the valve body being movable between a contact position at which the valve body contacts the nozzle plate to close the nozzle and a separated position at which the valve body is separated from the nozzle plate to open the nozzle;
- a valve body coupler coupled to the valve body; and
- a driver to drive the valve body coupler to move the valve body; and
- circuitry configured to:
  - execute a first operation to move the valve body between the contact position and the separated position to open and close the nozzle; and
  - execute a second operation to apply vibration to the valve body while the valve body is temporarily held at the separated position, and a pressure mechanism to apply a pressure to pressurize the liquid in the liquid chamber, wherein the circuitry executes the first operation while the pressure mechanism applies the pressure to the liquid in the liquid chamber to discharge the liquid from the nozzle onto an object, and the circuitry executes the second operation while the pressure mechanism temporarily stops application of the pressure to the liquid in the liquid chamber.

2. The liquid discharge apparatus according to claim 1, wherein the circuitry is further configured to selectively execute the first operation and the second operation.

3. The liquid discharge apparatus according to claim 1, further comprising:

a liquid path communicating with the liquid chamber, and a vibrator in the liquid path, the vibrator configured to apply vibrations to the liquid in the liquid path to vibrate the valve body through the liquid.

4. The liquid discharge apparatus according to claim 1, further comprising:

a moving mechanism to move the liquid discharge head to face a discharge area of the object, wherein the circuitry is further configured to:
- execute the first operation while the pressure mechanism applies the pressure to the liquid in the liquid chamber to discharge the liquid from the nozzle onto the discharge area of the object; and
- execute the second operation while the pressure mechanism temporarily stops application of the pressure to the liquid in the liquid chamber, and while the moving mechanism moves the liquid discharge head to an evacuation position at which the nozzle is out of the discharge area.

5. The liquid discharge apparatus according to claim 1, wherein the circuitry is further configured to control the pressure mechanism to apply the pressure to pressurize the liquid, and control the pressure mechanism to stop application of the pressure to pressurize the liquid.

6. The liquid discharge apparatus according to claim 1, wherein the circuitry is configured apply the vibration to the valve body such that the valve body vibrates in a range between the contact position and the separated position.

7. The liquid discharge apparatus according to claim 6, wherein the valve is at the contact position when a first voltage is applied to the driver, the valve is at the separated position when a second voltage is applied to the driver, and the second voltage is greater than the first voltage.

8. The liquid discharge apparatus according to claim 7, wherein to execute the second operation, the valve body vibrates in a range between positions corresponding to a third voltage and a fourth voltage, the third voltage is less than the fourth voltage, the third voltage and the fourth voltage are greater than the first voltage, and the third voltage and the fourth voltage are less than the second voltage.

* * * * *